United States Patent
Shapiro et al.

(10) Patent No.: US 9,503,812 B2
(45) Date of Patent: Nov. 22, 2016

(54) SYSTEMS AND METHODS FOR SPLIT ECHO CANCELLATION

(71) Applicant: Vidyo, Inc., Hackensack, NJ (US)

(72) Inventors: Ofer Shapiro, Fair Lawn, NJ (US); Ran Sharon, Tenafly, NJ (US); Alexandros Eleftheriadis, Tenafly, NJ (US)

(73) Assignee: VIDYO, INC., Hackensack, NJ (US)

( * ) Notice: Subject to any disclaimer, the term of this patent is extended or adjusted under 35 U.S.C. 154(b) by 9 days.

(21) Appl. No.: 14/448,592

(22) Filed: Jul. 31, 2014

(65) Prior Publication Data

US 2015/0131807 A1   May 14, 2015

Related U.S. Application Data (60) Provisional application No. 61/860,325, filed on Jul. 31, 2013.

(51) Int. Cl.
| | |
|---|---|
| *H04B 3/20* | (2006.01) |
| *H04R 3/00* | (2006.01) |
| *H04M 9/08* | (2006.01) |
| *H04B 3/23* | (2006.01) |

(52) U.S. Cl.
CPC ............. *H04R 3/002* (2013.01); *H04M 9/082* (2013.01); *H04B 3/20* (2013.01); *H04B 3/23* (2013.01); *H04B 3/231* (2013.01)

(58) Field of Classification Search
CPC .......... H04B 3/20; H04B 3/23; H04B 3/231; H04M 3/002

USPC .................................. 381/66, 83, 93, 96
See application file for complete search history.

(56) References Cited

U.S. PATENT DOCUMENTS

| | | | |
|---|---|---|---|
| 6,389,440 B1 | 5/2002 | Lewis et al. | |
| 7,593,032 B2 | 9/2009 | Civanlar et al. | |
| 8,095,120 B1 | 1/2012 | Blair et al. | |
| 9,042,567 B2* | 5/2015 | Huang ................... | H04M 9/082 370/289 |
| 2009/0252315 A1 | 10/2009 | Ratmanski et al. | |
| 2010/0322387 A1* | 12/2010 | Cutler ......................... | 379/32.01 |
| 2013/0251167 A1* | 9/2013 | Gautama .................. | H04B 3/23 381/66 |
| 2014/0146975 A1* | 5/2014 | Huang et al. ................... | 381/66 |

OTHER PUBLICATIONS

International Search Report and Written Opinion for PCT/US14/049203, dated Nov. 17, 2014.

* cited by examiner

*Primary Examiner* — Disler Paul
(74) *Attorney, Agent, or Firm* — Baker Botts L.L.P.

(57) ABSTRACT

Systems and methods for performing videoconferencing using split endpoints are disclosed herein. These endpoints can include a Main Unit and a Satellite Unit that are associated with each other, and where the tasks of video and audio encoding and decoding are separated between the two. In some embodiments the Main Unit performs video and audio encoding, and the Satellite Unit performs video and audio decoding. In some embodiments the Satellite Unit obtains media data through its associated Main Unit, whereas in other embodiments the Satellite Unit obtains media data directly from the Server.

3 Claims, 8 Drawing Sheets

FIG. 1 VMware View Architecture (prior art)

FIG. 2: Example multi-camera, multi-monitor system architecture

FIG. 3: Exemplary architecture of a videoconferencing system with multiple types of clients Echo canceller architecture se response is significant (i.e., nonzero) is
s. This corresponds to 16 to 32 tap positions
ling. However, because of the portion of
rcuit between the location of the echo
e hybrid, this response does not begin connection is in the middle. The reason
of coefficients required in the echo-c
directly related to the delay of the tail
location of the echo canceller and the h
the echo. In the split configuration, the 410   405   401

FIG. 4

FIG. 5: Split Endpoint Architecture with Decoding Satellite (a) Indirect-to-satellite media path (b) Direct-to-satellite media path

FIG. 6: Split Endpoint Architecture with Encoding Satellite

(a) Indirect-to-satellite media path (b) Direct-to-satellite media path

FIG. 7: Split echo canceller architecture

FIG. 8: Computer system

SYSTEMS AND METHODS FOR SPLIT ECHO CANCELLATION

CROSS-REFERENCE TO RELATED APPLICATION

This application claims priority to U.S. Ser. No. 61/860,325, filed Jul. 31, 2013, titled "Systems and methods for Split Echo Cancellation," the disclosure of which is incorporated by reference in its entirety.

FIELD

The disclosed subject matter relates to audio and audio-visual communication systems, including point-to-point or multi-point communication systems where endpoints have two or more separate components located in proximity, some performing audio encoding and some performing decoding, and where echo cancellation is applied.

BACKGROUND

Audio and video communication systems can involve two or more endpoints that are either connected directly to each other through a network, or through one or more servers. The latter configuration can be used for multi-point connections. The endpoints are loci for encoding and decoding audio and video, as well as encoding and decoding computer-generated imagery, referred to as "content".

An example of such contents the window from a PowerPoint presentation. In such endpoints, the encoding and decoding processes, for both video and audio, can be performed on the same system. An example endpoint would be a desktop computer where encoding and decoding are performed using software. Other endpoints may use custom or other encoding and decoding hardware to perform the corresponding encoding and decoding operations.

The computational demands of video and audio communication can lead to certain custom-made systems. Increasing computing power of general-purpose computers, has allowed them to perform the necessary functions using software implementations of the same algorithms on general-purpose CPUs. It is common to run videoconferencing applications on Windows PCs or MacOS systems.

Portable devices such as mobile phones and tablets can be equipped with built-in video and audio decoding chips and can be capable of performing such decoding with reduced power requirements. These devices, however, often perform encoding operations using software. In the absence of dedicated encoding hardware, the encoding runs on the general-purpose CPU of these devices and consumes power. They can also be limited by the overall speed profile of the particular microprocessor.

Certain video and audio coding algorithms are asymmetric, with the encoding process more complex than the decoding process. This can make the task of video encoding challenging. As described in commonly assigned International Patent Application No. PCT/US14/036409, "Systems and Methods fir Using Split Endpoints in Video Communication Systems," incorporated herein by reference in its entirety, it can be advantageous to offer one or more separate system units that would perform video encoding, and operate in conjunction with the main unit that performs decoding and display. More than one unit can be used if more than one video stream would need to be encoded. By taking the encoding operation outside the main unit, more resources can be provided and lead to improved video quality.

There are other examples where such split system operation can be desirable. Consider the case Where one conducts a videoconference with his or her phone, and wants to display the video signal(s) on a nearby TV set. Connecting the phone to the TV with a cable can be done, but likewise can be cumbersome. It can be useful to have a second unit that would attach to the TV and would perform decoding and display, and perform encoding on the phone itself. In this example, one may prefer decoding to be performed on the "satellite" system rather than the main unit.

An example where it is desirable to have encoding be done on the "satellite" system is thin clients, commonly referred to as "virtual desktop infrastructure" (VDI) clients. VDI environments can involve two components: a server component; and a client component. The server component involves a server that can run multiple virtual machine (VM) instances. Each such VM runs an operating system of choice, together with any desired application software that is installed on it. The VM is the actual computer that the end user access. The client component of the VDI environment can utilize software that provides remote access to the remote VM running on the server. The client software is typically very small and efficient, and can thus run on much simpler (and cheaper) hardware than the one running in the VM. Some VDI solutions bundle the client software together with hardware to run it.

Figure 1:
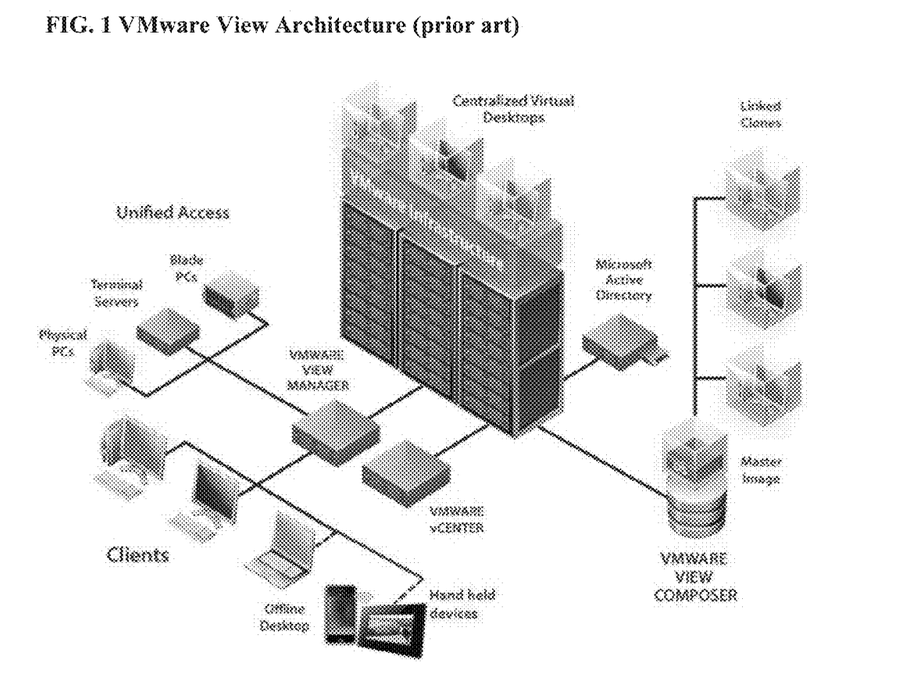
FIG. 1 illustrates the architecture of a commercially available VDI system (prior art)

VDI systems can allow the partitioning of computational capability so that certain requirements fall on the server side rather than the client side. This can provide an advantage since the server component can be shared by many users and can be more easily managed. In addition, the client component can run on a wide array of different devices, including desktops, laptops, iPads, smartphones, etc., giving users tremendous flexibility in terms of ways to access their data a d applications. FIG. 1 shows an example architecture of a VMware View system.

One component of the architecture is the communication between the server and the client component. This is because the quality of the experience that the user enjoys has to do with the responsiveness of the system, as experienced on the client device. If, for example, it takes a considerable amount of time from the instance a user clicks on a button until the button is shown to transition to its clicked state, it may be very frustrating. This transition can depend on the amount of time it takes for the click event to be transmitted from the client to the server, the time it takes for the server to respond to the event, and for the screen update to propagate from the server to the client. This last component can be subject to the highest delay, since it involves the transmission of non-trivial amounts of data from the server to the client.

VDI environments can employ custom protocols to improve the communication of data from, at least, the server to the client and thus minimize both the bitrate needed as well as the delay. The VMware View environment can use the proprietary PCoIP protocol, discussed in "VMware View 5, Performance and Best Practices," published by VMware and available on the web site http://www.wmware.com.

The physical separation of the server component and the client component may be challenging for real-time multimedia applications, such as streaming video and videoconferencing. This is because these applications typically are designed so that the media decoder runs on the same computer or system that the display will take place. There can be a high speed data path available for the decoded data to be sent from the decoder to the display. In a VDI environment, the decoding can take place in the server and the display on the client. This can necessitate the transmission of uncompressed, high-volume data such as video to be transmitted from the server to the client. Particularly for applications such as videoconferencing, where both delay and bitrate constraints are strict, this can represent a challenge.

Techniques to address this include the incorporation of the codec within the VDI client system. Considering that the client may not be designed to be a particularly powerful device, for these systems it may be advantageous to be able to over a second satellite system component that would perform the encoding operation, with the main client unit performing the decoding operation.

Figure 2:
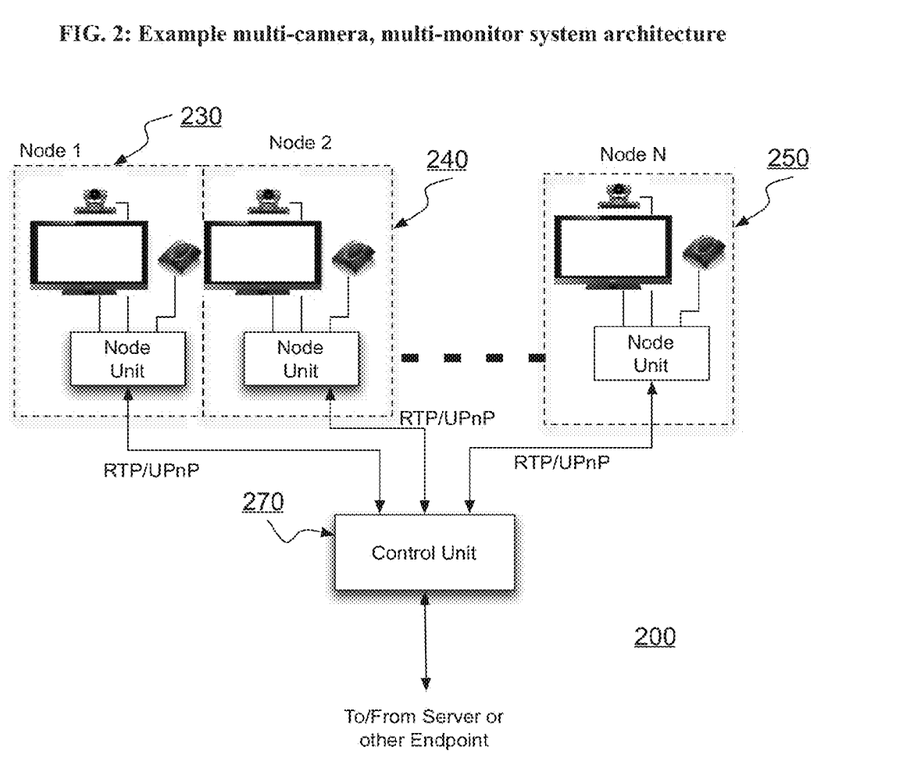
FIG. 2 illustrates the architecture of a multi-monitor/multi-camera endpoint.

The ability to have distinct system components perform encoding and decoding can also be relevant for multi-camera, multi-monitor systems. These configurations can be used in telepresence systems, among others. Commonly assigned International Patent Application No. PCT/US11/038003, "System and method for scalable communication using multiple cameras and multiple monitors," incorporated herein by reference in its entirety, describes systems and methods for designing systems with multiple cameras and/or multiple monitors. An example of such a system is shown in FIG. 2. The multi-camera/multi-screen endpoint includes a Control Unit 270 to which several Node Units (230, 240, 250) are attached. Three Node Units are shown by way of example; more or less can be used. The Node Units 230, 240, and 250 can perform encoding and/or decoding as desired. The configuration is similar to one with a main system and one or more satellite systems: the main unit could be a Control Unit with a Node Unit that performs either encoding or decoding; and the satellite unit could be a second Node Unit that performs the other operation (decoding or encoding, respectively). The connection between the individual systems (main and satellite system) can be by network (wired or wireless), by USB attachment (the satellite is a USB device that is attached to the main unit), or some other suitable communication means.

In the above examples, whenever audio capture and playback occur in different system components, it can be beneficial to address the issue of echo cancellation. Echo cancellation addresses the problem that the audio played back by a system's speaker(s) is picked up by the system's microphone(s) and is thus sent back to its origin, where it will be heard as an echo. Echo cancellation can be implemented on a device that performs both acquisition as well as playback, or on a device that is connected to such an audio playback and recording device. For example, in telephony, echo cancellation may be implemented on a central office switch, although the actual audio is captured and played back at a telephone located in the user's premises.

In certain audio and video communication systems, where the endpoint has the computational capacity or hardware to perform echo cancellation, it can be applied on the endpoint itself. This can be performed in software running on the host CPU, or it can run in specialized hardware that is included in the audio equipment used in the endpoint. Several commercially available USB speakerphones, for example, feature built-in echo cancellation.

In these systems, the device that performs the echo cancellation can have access to both the audio that is played back as well as the audio that is being captured. In split systems, however, where these functions may be performed by distinct system components, this assumption may no longer apply. There exists a need for an improved technique that enables the use of echo cancellation in such split endpoint systems.

SUMMARY

Systems and methods for performing echo cancellation in communication systems that use split endpoints are disclosed herein.

In some embodiments, endpoints can include a main unit and one or more satellite Units. In some embodiments, the main unit can be responsible for overall system control and audio capture, and the satellite units for audio playback. In other embodiments the main unit can be responsible for overall system control and audio playback, and the satellite units for audio capture.

Echo cancellation can be performed on the component that is performing capture, by making available to it the audio components that are being sent to the component that is performing playback, even though the capturing component may not be performing playback.

Throughout the figures the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Figure 3:
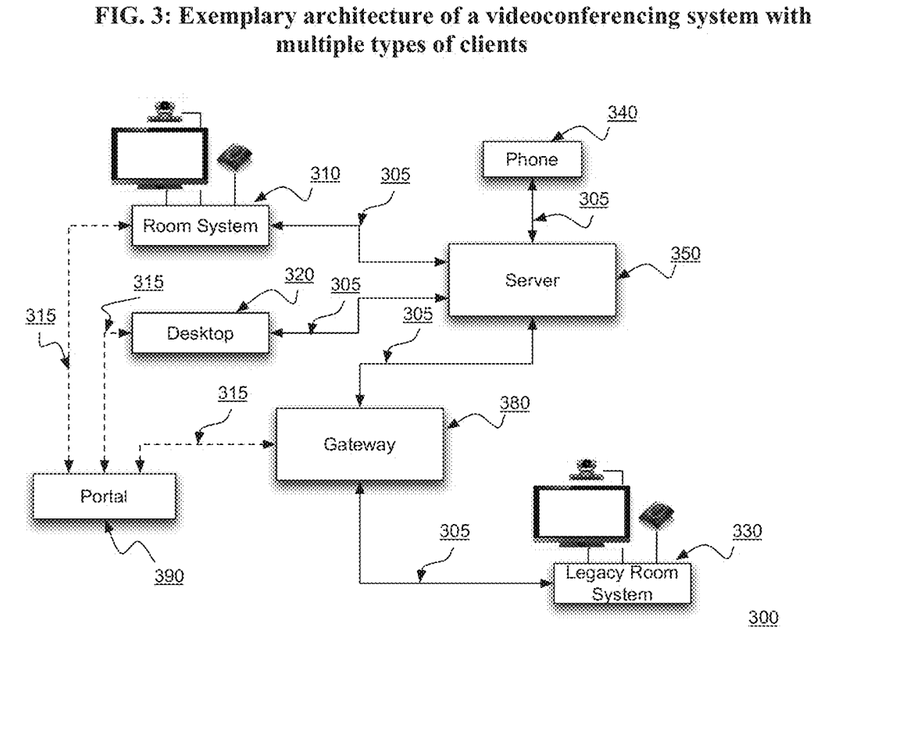
FIG. 3 depicts an exemplary architecture of a videoconferencing system with multiple types of clients in accordance with one or more embodiments of the disclosed subject matter.

FIG. 3 depicts the architecture of an example videoconferencing system with multiple types of endpoints (or clients). The architecture can include a Room System 310, a Phone 340, and a Desktop 320 (e.g., a Windows PC). These endpoints can be interconnected through a Server 350, to which they connect using network connections 305. User and system administration can be performed at a Portal 390, which communicates to the various system components through appropriate signaling connections 315 over a network. The system also shows a Gateway 380 which can be used to convert from the video and audio formats that the endpoints are using to other video and audio formats, so that other systems are able to join the conference. The figures shows a Legacy Room System 330, by way of example, that connects to the Gateway 380. The Gateway 380 can connect to the Server 350, and represent the Legacy Room System 330 in the conference. More or less Endpoints can be connected to the Server, and more than one Legacy Endpoint may connect to the Gateway, as is recognized by persons skilled in the art. Similarly, the system may feature more than one Server in a cascade or other configuration, and may also feature more than one Gateway.

Examples of these systems include the VidyoRoom (Room System 310), VidyoDesktop running on a PC (Desktop 320), Vidyo iPhone/iPad application running on an iPhone or an iPad (Phone 340), VidyoRouter (Server 350), VidyoGateway (Gateway 380), and VidyoPortal (Portal 390) products offered commercially by Vidyo, Inc.

The endpoints shown in FIG. 3 assume that the endpoint combines the capture and playback operations. Such endpoints are equipped with echo cancellers to eliminate the portion of the far-end signal that is captured together with the near-end signal at the endpoint, as it is played back from the speaker(s)/headset.

Figure 4:
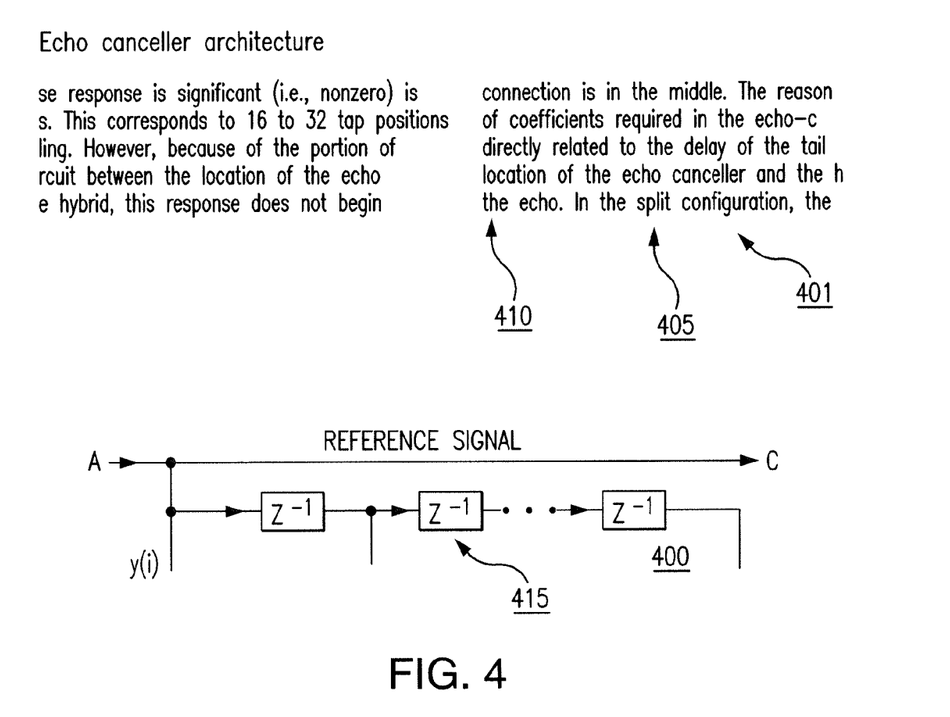
FIG. 4 depicts an exemplary architecture of an echo canceller.

FIG. 4 depicts an exemplary architecture of an echo canceller 400, as described in "Digital Voice Echo Canceller with a TMS32020," by D. Messerschmittt et al., Texas Instruments Application Report SPRA129, 1989, incorporated herein by reference in its entirety. The Echo Canceller module 410 can provide an estimate of the echo so that it is removed (subtracted) from the signal captured through the "Hybrid" 405 from the near-end talker 401. The signal x(i) represents the near-end talker, and the signal r(i) represents the echo. The combination of these signals (x(i)+r(i)) is provided by the Hybrid 405 to the adder 415, where the estimate of the echo r̂(i) is subtracted from it. The result of the echo cancellation u(i) can be used by the Echo Canceller 410 as feedback in order to improve the accuracy of the process. There are several different implementations of the particulars of the Echo Canceller unit 410 (essentially, an adaptive filter), as is known to persons skilled in the art.

Figure 5:
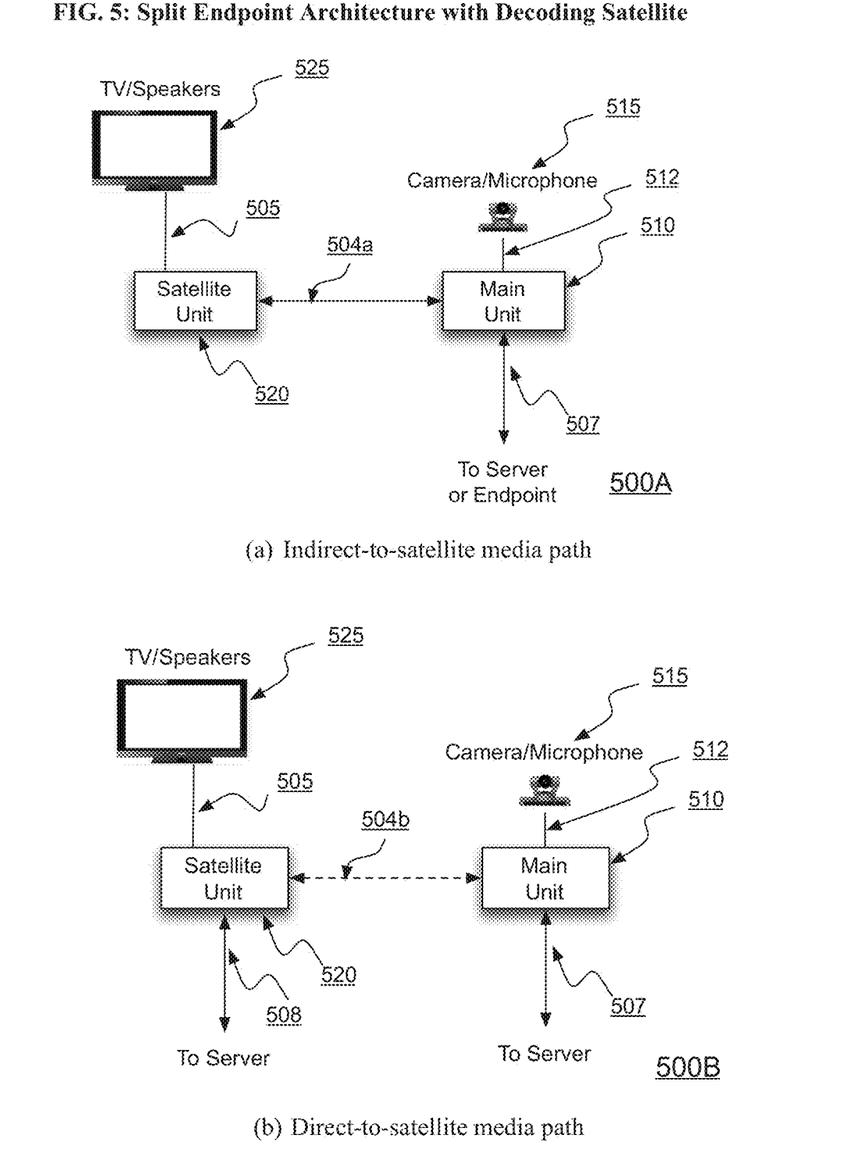
FIG. 5 depicts an exemplary architecture of a split endpoint with a decoding satellite, with indirect (a) and direct (b) media paths from the server to the satellite system.

FIG. 5(a) depicts an exemplary architecture of a split endpoint 500. The Endpoint 500 includes a Main Unit 510 and a Satellite Unit 520. The Main Unit 510 can be equipped with, or connected to a Camera and Microphone 515. The connection can be via USB or other suitable means. The Satellite Unit 520 can be connected to, or equipped with, a display such as a TV and speakers 525. The connection 505 from the Satellite Unit 520 to the TV/Speakers 525 may be HDMI or other suitable means.

In some embodiments of the disclosed subject matter, the Satellite Unit 520 may be a mini PC or custom hardware device powered by a USB connection. In this case the Satellite Unit 520 may be plugged in to an available USB port of a modern TV set in order to obtain power, and connected to the display using an HDMI or other audiovisual connection in order to provide video and audio output to the TV. In some embodiments, video and audio output can be provided to the TV through the USB connection itself.

The Main Unit 510 can connect to a videoconferencing server or directly to another endpoint using a network connection 507. The connection may be wireless or wired, or a combination thereof. The Satellite Unit 520 and Main Unit 510 can communicate with each other using a connection 504a. The connection 504a may be over an IP network such as the wireless network commonly found in offices and households. In some embodiments of the disclosed subject matter the Satellite Unit 520 obtains all data (video, audio, and signaling) through its connection 504a to the Main Unit 510. In other embodiments, as shown in FIG. 5(b), the Satellite Unit 520 may Obtain media data directly from the server through its own connection 508. The Satellite Unit 520 to Main Unit 510 connection 504b in this case carries signaling data. In the direct-to-satellite media path case, where the two units have separate media connections, it would be less convenient to connect directly to another endpoint, and thus only a connection to a Server is shown for the Connection 507. However, appropriate signaling can be used to connect directly to another endpoint as would be understood to persons skilled in the art.

Figure 6:
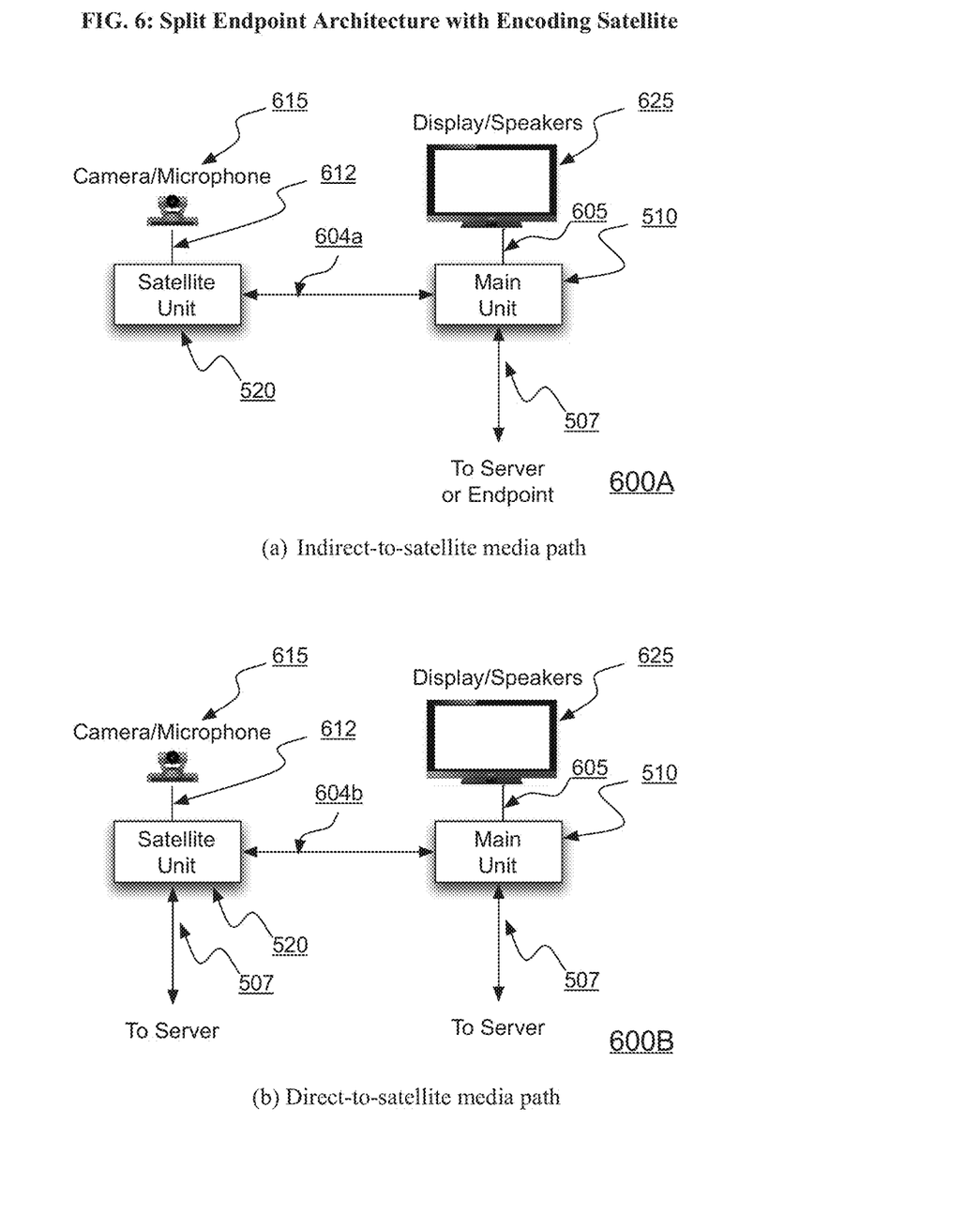
FIG. 6 depicts an exemplary architecture of a split endpoint with an encoding satellite, with indirect (a) and direct (b) media paths from the server to the satellite system.

As shown in FIG. 5, the Satellite Unit can provide playback/display operation whereas the Main Unit can perform capture. These responsibilities can be exchanged such that the Main Unit performs playback/display and the Satellite Unit performs capture. This is shown in FIGS. 6(a) and (b). In this embodiment, the Main Unit 506 is equipped with, or connected to, speakers and optionally a display. The connection may be through HDMI or other suitable means. The Satellite Unit 520 can be equipped with, or connected to, a camera and/or microphone 615. The connection 612 may be through USB or other suitable audiovisual connection. Although only one Satellite Unit is shown, the system operates in an identical way when more than one Satellite Unit is available. As with FIG. 5, there can be at least two configurations: one where the Satellite Unit 520 can connect to the server through the Main Unit 606 (FIG. 6(a)); and one where the Satellite Unit 520 can connect to the server directly ((FIG. 6(b)). In the former case, the Satellite Unit 520 and Main Unit 506 communicate with each other over the connection 604a which carries both signaling and media data, whereas in the latter case the connection 604b carries signaling data.

The operation of the system can be essentially identical regardless if the Satellite Unit performs playback/display or capture. In some embodiments, the Main Unit may be a smart phone such as an iPhone, or a tablet such as an iPad. In other embodiments, it may be a VDI thin client. For an iPhone or iPad, it can be useful if the Satellite Unit performs playback/display on a big TV screen whereas the iPhone or iPad (Main Unit) performs capture. The Satellite Unit may be implemented on a USB stick mini PC running the Google Android operating system, such as the MK802 device commercially available by Shenzhen Rikomagic Tech Corp. Ltd. The device can plug in to a USB port and provides an HDMI video and audio output.

For a VDI thin client, it can be useful if the Satellite Unit performs the capture whereas the VDI thin client (Main Unit) performs the playback/display.

Two alternative configurations are: the Main Unit performs video capture and audio playback, and the Satellite Unit performs video display and audio capture; and, conversely, the Main Unit performs video display and audio capture, and the Satellite Unit performs video capture and audio playback. These can be implemented in the same way as the other two configurations presented above.

The operation of the split endpoint in terms of configuration and media transfer is next described with reference to the decoding satellite configuration of FIG. 5. However, it is noted that the operation can be substantially identical for the encoding satellite configuration as is recognized by persons skilled in the art.

The functionality of a split endpoint cat be implemented using two endpoints as follows. One endpoint can be connected to the videoconferencing call and its audio and video is muted, i.e., the endpoint does not generate any audio or video. It does, however, receive video and audio from the system and displays it on its screen, and plays the corresponding audio on its speaker/headphones. A second endpoint can be connected to the videoconferencing call. Depending on the endpoint implementation, the endpoint may be able to request from the system that it does not receive video, or audio, or both. Typically the endpoint may be able to indicate that it does not want to receive video, but it does not have a choice with regards to audio. This cat be the case with the commercially available VidyoDesktop system offered by Vidyo, Inc. The user can select the number of participants to show on the screen, and the system does offer an option of setting the number to zero. For the audio, however, the user can set the output volume to zero, so that no audio is produced by the device. Although functionally this appears to implement a split endpoint system, the system may waste bandwidth because the second system receives audio that it will not play. Also the encoding or decoding capability of the corresponding system may not be utilized. Finally, setting up this configuration may be cumbersome as the user has to make two connections and set the systems up in the proper way.

An exemplary split system operation with split echo cancellation is now described. The Main Unit can be a smartphone such as an iPhone running appropriate software, and the Satellite Unit can be a USB-based computer with an HDMI output for video and audio, again running appropriate software. The software on the Main Unit can offer an option to run its endpoint client in standalone mode or in split mode. When the user selects the split mode, the software on the Main Unit can display a list of available Satellite Units, including an option to add new ones. When the user requests that a new one is to be added, the software on the Main Unit can transmit broadcast packets on the local network on a predefined port and waits for any response.

When the Main Unit is in such "pairing" mode, the Satellite Unit can be turned on and can also be set in "pairing" mode by pressing a button. If no button is available due to the form factor, the Satellite Unit can enter pairing mode for a minute during power on, before proceeding with its operation. It can also automatically enter pairing mode if it detects that it is not paired with any Main Unit.

When the Satellite Unit receives a pairing request from a Main Unit, it can respond and from that point forward, until reset, it can operate as the Satellite Unit associated with that particular Main Unit. The Satellite Unit can be provided with conferencing data such as user name etc. from the Main Unit.

In another embodiment, the Satellite Unit may be registered first to the Portal rather than the Main Unit. In this case the list of available Satellite Units can be provided to the Main Unit through the Portal during user registration. Connecting a Satellite Unit to the Portal may require some configuration, since the Portal may not be on the same local network as the Satellite Unit. A web-based interface may be provided on the Satellite Unit for such configuration, similar to the web-based interface provided in network routers and other similar devices that lack a user interface.

Yet another mechanism for automatically associating a Main Unit with a Satellite Unit may be their common geographical location, as identified by GPS coordinates or by WiFi location data. Other mechanisms for establishing the association between the Main Unit and a Satellite Unit may be used as well without affecting the operation of the disclosed split echo cancellation process.

The operation of the split endpoint during a call may differ depending on if an indirect or a direct media path to the Satellite Unit is utilized. First consider the indirect-to-satellite media path (as shown in HG. 5(a)). When the Main Unit makes or receives a call, it can proceed to transmit and receive media as a normal endpoint. In fact, as far as the remote Server or Endpoint is concerned (not shown in the figure), there may be no way to distinguish if the endpoint is split or not. The Main Unit, however, can forward media data to the Satellite Unit for decoding and display/play back. It also can send it information when a call is established or terminated. Encoding can take place on the Main Unit and thus does not involve the Satellite Unit. In an encoding Satellite Unit as shown in FIG. 6, then the Satellite Unit may be transmitting encoded video and audio data to the Main Unit for forwarding to the Server.

Note that the communication of the media data between the Main Unit and the Satellite Unit can be performed across a network connection (404*a* and 504*a*). As a result, the data may experience losses or delays. The Main Unit and Satellite Unit may employ techniques similar to those employed by the Server and other Endpoints to mitigate such losses.

In one embodiment of the disclosed subject matter Scalable Video Coding (SVC) may be used. SVC is an extension of the well-known video coding standard H.264 that is used in most digital video applications and has proven to be very effective in interactive video communication. The bitstream syntax and decoding process are formally specified in ITU-T Recommendation H.264, and Annex G. ITU-T Rec. H.264, incorporated herein by reference in its entirety, and can be obtained from the international telecommunications Union, Place de Nations, 1120 Geneva, Switzerland, or from the web site www.itu.int. The packetization of SVC for transport over RTP is defined in RFC 6190, "RTP payload format for Scalable Video Coding," incorporated herein by reference in its entirety, which is available from the Internet Engineering Task Force (IETF) at the web site http://www.ietf.org.

Scalable video and audio coding has been beneficially used in video and audio communication using the so-called Scalable Video Coding Server (SVCS) architecture. The SVCS is a type of video and audio communication server and is described in commonly assigned U.S. Pat. No. 7,593,032, "System and Method for a Conference Server Architecture for Low Delay and Distributed Conferencing Applications", as well as commonly assigned International Patent Application No. PCT/US06/62569, "System and Method for Videoconferencing using Scalable Video Coding and Compositing Scalable Video Servers," both incorporated herein by reference in their entireties. It provides an architecture that allows for very high quality video communication with high robustness and low delay.

Commonly assigned International Patent Application Nos. PCT/US06/061815, "Systems and methods for error resilience and random access in video communication systems," PCT/US07/63335, "System and method for providing error resilience, random access, and rate control in scalable video communications," and PCT/US08/50640, "Improved systems and methods for error resilience in video communication systems," all incorporated herein by reference in their entireties, further describe mechanisms through which a number of features such as error resilience and rate control are provided through the use of the SVCS architecture.

Techniques such as "R" pictures (PCT/US06/061815, previously cited) with NACK-based retransmissions can be used not only between Endpoints and Servers, or between Servers, but also between the Mail Unit and Satellite Unit. The feature is also available through the RTP payload format for SVC (RFC 6190 previously cited), with the TL0PICIDX and related parameters.

In alternative embodiments, call signaling may be duplicated between the Server and the Satellite Unit rather than be routed through the Main Unit. In other embodiments where Server cascading is used, the system may assign different Servers to the Main Unit and the Satellite Unit.

Cascaded server operation is described, for example, in commonly assigned International Patent Application No. PCT/US11/052430, "System and method for the control and management of multipoint conferences," incorporated herein by reference in its entirety.

The operation of echo cancellation in split endpoint configurations requires that the component performing echo cancellation, typically the capturing device, has available to it the audio data that is being played out by the playback device, even though it does not perform playback itself. In other words, the capturing device has to receive the exact same data that the playback device is receiving, in order to decode it, and use it in the echo cancellation process. In the indirect-to-satellite media path example of FIG. 5(a), the capturing device is the Main Unit 510. Due to the particular configuration, the playback audio data destined for the Satellite Unit 520 is already routed through the Main Unit 510. This means that the Main Unit 510 already has the audio data available, and can use it for performing echo cancellation, as explained later on.

Next consider the exemplary direct-to-satellite media path (as shown in FIG. 5(b)). In this configuration, a direct connection between the Satellite Unit and the Server or Endpoint is established when making or receiving a call. For this purpose, the Server or Endpoint can be configured to support split endpoint operation. Practically, this means that it will use two different connections for transmitting and receiving media data. Depending on whether an Encoding or Decoding Satellite Unit is used, the Server or Endpoint will receive from, or transmit data to, the Satellite Unit, and correspondingly transmit data to, or receive from, the Main Unit. The Satellite Unit information (IP address and other configuration information) can be provided to the Server or Endpoint from the Main Unit when it establishes a connection for making or receiving a call. The Main Unit is still responsible for call handling, such as hanging up, etc. It can inform the Satellite Unit on any state changes through its signaling connection 504b/604b. For example, if the user selects to mute on the Main Unit 510 as shown in FIG. 5(b), the Main Unit 510 can send a message to the Satellite Unit 520 over the connection 504b.

With continued reference to FIG. 5(b), in this exemplary embodiment echo cancellation is performed on the Main Unit 510 that hosts the audio capture device. The audio playback, however, is only performed on the Satellite Unit 520. This means that, under normal circumstances, the Main Unit 510 would not have the necessary audio data required for performing echo cancellation. In order to perform such split echo cancellation, the system has to be configured to transmit to the Main Unit 510 the exact same audio data that it is transmitting to the Satellite Unit 520 so that it can decode it, and perform echo cancellation as if it was the device performing the playback. An implicit assumption here is that the Main Unit 510 and Satellite Unit 520 are in relatively close physical proximity, so that the microphone 515 of the Main Unit 510 picks up the audio played back by the speakers 525 of the Satellite Unit 520.

In the encoding satellite configurations shown in the exemplary embodiment disclosed in FIG. 6, similar observations can be made. In FIG. 6(a), the Satellite Unit 520 has to perform echo cancellation. The Main Unit 510 thus has to forward to the Satellite Unit 520 all the relevant audio information so that it can decode it and execute the relevant algorithm. In the configuration of FIG. 6(b), the system has again to be configured so that the Satellite Unit 520 gets the same audio data that the Main Unit 510 will receive, even though it does not perform any playback itself.

The operation of the split echo cancellation for all the different cases described above is summarized in FIG. 7. The figure shows two distinct components: the Playback Unit 710 and the Capture Unit 720. Depending on the particular configuration, the Playback Unit 710 may be in a Main Unit or a Satellite Unit, whereas the Capture Unit 720 may correspondingly be in a Satellite Unit or a Main Unit. The Playback Unit 710 performs playback as any regular endpoint would do. It receives audio with some delay 701, performs decoding and, if the SVCS architecture is used, mixing, and then plays back the audio through Speaker 715 or other suitable playback device. Mixing is required in SVCS and SVCS-like architectures such as media relays, as the endpoint may receive multiple separate audio streams from the server. In these architectures it is the responsibility of the endpoint to perform the actual audio mixing, instead of the traditional audio bridge or Multipoint Control Unit (MCU).

Figure 7:
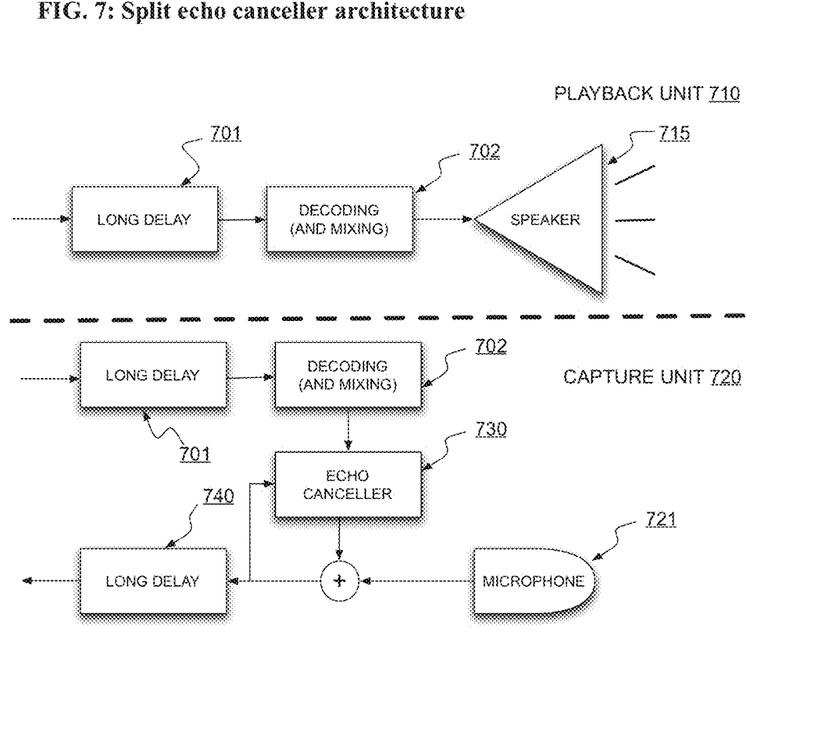
FIG. 7 depicts an exemplary split echo canceller architecture according to an embodiment of the disclosed subject matter.

The Capture Unit 720 can be configured as follows. It can include the same Decoding (and Mixing) 702 components that the Playback Unit 710 contains even though it does not perform any audio playback itself. It can have the same components so that it can re-create the audio played back at the Playback Unit 710. That audio is used as input to the Echo Canceller 730, who operates in a similar way as the Echo Canceller of FIG. 4. The system has to be configured so that the device that performs echo cancellation is receiving the exact same audio with the device that performs audio playback. Any dejittering and, if the SVCS architecture is used, mixing algorithm, between the two systems should be ideally identical to ensure converge of the echo cancellation process.

Although FIG. 7 shows a single Playback. Unit 710 and a single Capture Unit 720, the split echo canceller architecture works in essentially the same way when multiple units are available. For example, consider a case where several users are all in a conference room, and join a common conference through their personal device, such as a laptop or a tablet. Audio playback of remote participants may be provided a room-based communication system. The conference room participants can operate their personal devices as split endpoints, where only their audio capture capability is used and not their audio playback. Of course other aspects of operation of their personal devices can be used freely, such as content annotation, etc. The personal devices should all implement the Capture Unit 720 operation and, consequently, the server(s) to which they are connected should transmit to them the same audio that is being sent to the room-based system. As before, this audio will be decoded at the personal devices but not played back; it will only be used as input to the split echo canceller.

The association of the personal devices in the example above with the room system can be performed in a number of ways. For example, there can be an option in the portal interface that a user of a personal device may see which allows the user to identify another device as the audio playback device. The system will then execute split echo cancellation on the personal device using the audio from the identified other device, which the system will ensure is forwarded to it. Another way is to perform such association automatically, using location information. The location information can be based, for example, on the local IP address, gateway MAC address, GPS information, or WiFi location information.

Another way to automatically establish audible neighbors, i.e., Playback Units 710, to Capture Units 720, is to have all Playback Units 710 emit a brief unique identifying sound at the request of a user or the system. The sound may encode a unique identifier that allows the system to identify its source. For example, each Playback Unit could transmit a sine wave at a distinct frequency, or it could periodically transmit a digitally encoded unique identifying number. The emitted sounds can be such that are not audible by human listeners. For example, they can be narrowband signals on the high end of the audible spectrum, where the human auditory system is least sensitive, or they could be spread-spectrum so that they appear like noise. During that time, Capture Units 720 analyze the received audio to identify units that are in their vicinity, i.e., within audible range. They can then instruct the system to forward to them the audio that is transmitted to these units, so that they can properly execute their split echo cancellation algorithm.

With continued reference to FIG. 7, multiple Playback Units 710, in addition to multiple Capture Units 720, can be utilized. The split echo canceller architecture can work in a similar manner, although there is a need to identify which Playback Units 710 are audible in which Capture Units 720. The identification mechanism described previously can help to automate the process. The system can then be configured to transmit to the Capture Units 710 all the audio that is transmitted to the Playback Units 720 audible to them. In architectures that use multiple streams, if there are more than one Playback Units 710 within audible range of a Capture Unit 720, then if there are common streams between the multiple Playback Units 710 they only need to be sent once to the Capture Unit 720. In architectures that use a single audio stream, such as those relying on an audio bridge or MCU, if multiple Playback Units 710 are involved, then the Capture Unit 720 has to perform its own g in order to combine the audio signals from the multiple Playback Units 710.

The use of split endpoints and of split echo cancellation allows the seamless integration of portable devices in videoconferencing environments. A common mode of use is to have users join a room-based videoconference from their personal devices. Since these users may be sitting across each other in the same room, they do not need to be treated as regular participants. In addition to running split audio cancellation on their portable devices, the system can be configured to not send any video information from the personal devices of these participants to the room system. In that way, the personal devices are used as remote microphones, and of course they can still be used for content sharing or annotation.

The methods for using split endpoints in video communication systems described above can be implemented as computer software using computer-readable instructions and physically stored in computer-readable medium. The computer software can be encoded using any suitable computer languages. The software instructions can be executed on various types of computers. For example, FIG. 8 illustrates a computer system 0800 suitable for implementing embodiments of the present disclosure.

Figure 8:
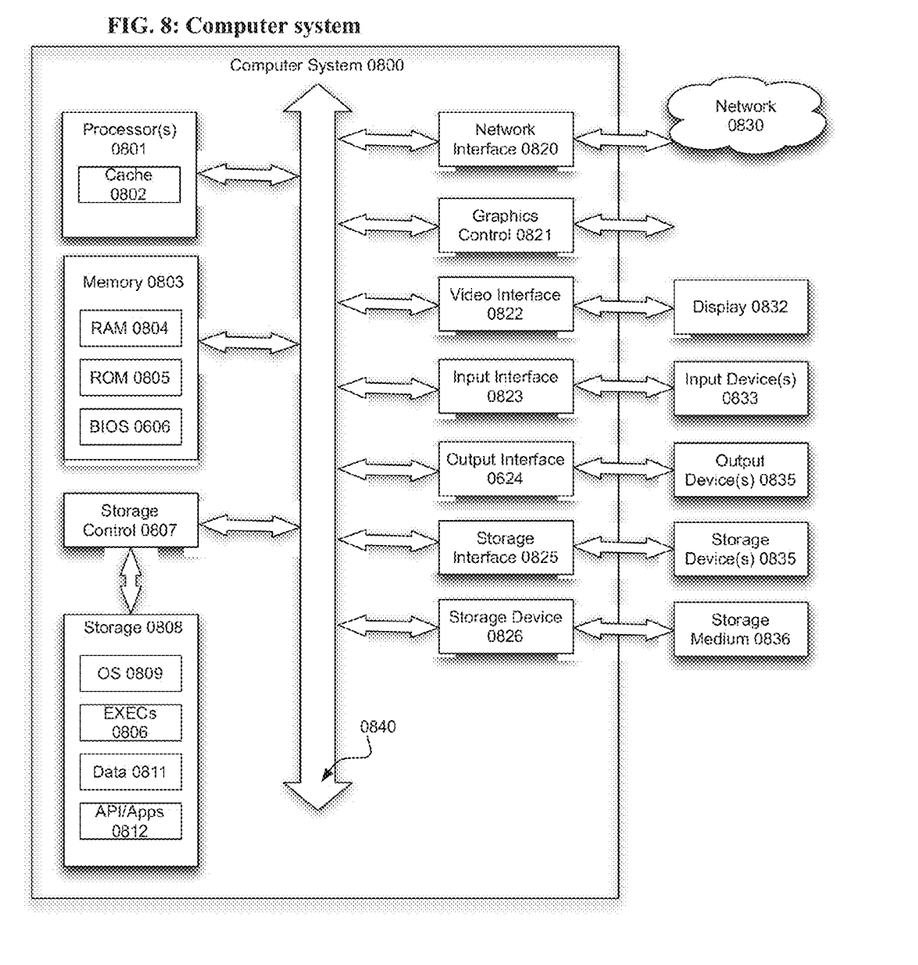
FIG. 8 depicts an exemplary computer system according to an embodiment of the disclosed subject matter.

The components shown in FIG. 8 for computer system 0800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 0800 can have many physical forms including an integrated circuit, a printed circuit board, a small handheld device (such as a mobile telephone or PDA), a personal computer or a super computer.

Computer system 0800 includes a display 0832, one or more input devices 0833 (e.g., keypad, keyboard, mouse, stylus, etc.), one or more output devices 0834 (e.g., speaker), one or more storage devices 0835, various types of storage medium 0836.

The system bus 0840 link a wide variety of subsystems. As understood by those skilled in the art, a "bus" refers to a plurality of digital signal tines serving a common function. The system bus 0840 can be any of several types of bus structures including a memory bus, a peripheral bus, and a local bus using any of a variety of bus architectures. By way of example and not limitation, such architectures include the Industry Standard Architecture (ISA) bus. Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 0801 (also referred to as central processing units, or CPUs) optionally contain a cache memory unit 0802 for temporary local storage of instructions, data, or computer addresses. Processor(s) 0801 are coupled to storage devices including memory 0803. Memory 0803 includes random access memory (RAM) 0804 and read-only memory (ROM) 0805. As is well known in the art, ROM 0805 acts to transfer data and instructions uni-directionally to the processor(s) 0801, and RAM 0804 is used typically to transfer data and instructions in a bi-directional manner. Both of these types of memories can include any suitable of the computer-readable media described below.

A fixed storage 0808 is also coupled bi-directionally to the processor(s) 0801, optionally via a storage control unit 0807. It provides additional data storage capacity and can also include any of the computer-readable media described below. Storage 0808 can be used to store operating system 0809, EXECs 0810, application programs 0812, data 0811 and the like and is typically a secondary storage medium (such as a hard disk) that is slower than primary storage. It should be appreciated that the information retained within storage 0808, can, in appropriate cases, be incorporated in standard fashion as virtual memory in memory 0803.

Processor(s) 0801 is also coupled to a variety of interfaces such as graphics control 0821, video interface 0822, input interface 0823, output interface 0824, storage interface 0825, and these interfaces in turn are coupled to the appropriate devices. 111 general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 0801 can be coupled to another computer or telecommunications network 0830 using network interface 0820. With such a network interface 0820, it is contemplated that the CPU 0801 may receive information from the network 0830, or may output information to the network in the course of performing the above-described method. Furthermore, method embodiments of the present disclosure can execute solely upon CPU 0801 or can execute over a network 0830 such as the Internet in conjunction with a remote CPU 0801 that shares a portion of the processing.

According to various embodiments, when in a network environment, i.e., when computer system 0800 is connected to network 0830, computer system 0800 can communicate with other devices that are also connected to network 0830, Communications can be sent to and from computer system

0800 via network interface 0820. For example, incoming communications, such as a request or a response from another device, in the form of one or more packets, can be received from network 0830 at network interface 0820 and stored in selected sections in memory 0803 for processing. Outgoing communications, such as a request or a response to another device, again in the form of one or more packets, can also be stored in selected sections in memory 0803 and sent out to network 0830 at network interface 0820. Processor(s) 0801 can access these communication packets stored in memory 0803 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 0800 can provide functionality as a result of processor(s) 0801 executing software embodied in one or more tangible, computer-readable media, such as memory 0803. The software implementing various embodiments of the present disclosure can be stored in memory 0803 and executed by processor(s) 0801. A computer-readable medium can include one or more memory devices, according to particular needs. Memory 0803 can read the software from one or more other computer-readable media, such as mass storage device(s) 0835 or from one or more other sources via communication interface. The software can cause processors) 0801 to execute particular processes or particular parts of particular processes described herein, including defining data structures stored in memory 0803 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosed subject matter. It will thus be appreciated that those skilled in the art will be able to devise numerous systems and methods which, although not explicitly shown or described herein, embody the principles of the disclosed subject matter and are thus within the spirit and scope thereof.

What is claimed is:

1. A system for performing acoustic echo cancellation in a conferencing system, the system comprising:
    one or more playback units configured to receive first audio signals and convert the first audio signals to sound, each playback unit being coupled to one or more speakers; and
    one or more capture units configured to convert sound into second audio signals suitable for transmission, each capture unit being coupled to one or more microphones;
    wherein each of the one or more playback units are configured to transmit a unique identification sound, wherein each of the one or more capture units are configured to identify any of the one or more playback units that are positioned within a listening distance therefrom based on the corresponding unique identification sound(s), wherein each of the one or more capture units are configured to instruct the conferencing system to transmit a copy of the first audio signals that correspond to the one or more playback units that are within the listening distance thereto, and wherein each of the one or more capture units is further configured to perform acoustic echo cancellation on the second audio signals using the copy of the first audio signals that correspond to the one or more playback units that are within the listening distance.

2. A method for performing acoustic echo cancellation in a conferencing system, the method comprising:
    receiving first audio signals at one or more playback units and converting the first audio signals to sound, each playback unit being coupled to one or more speakers;
    at one or more capture units converting sound into second audio signals suitable for transmission, each capture unit being coupled to one or more microphones;
    at the one or more playback units, transmitting a unique identification sound; at the one or more capture units, identifying any playback units that are within a listening distance therefrom, at the one or more capture units, instructing the conferencing system to transmit to a copy of the first audio signals that correspond to the one or more playback units that are within the listening distance thereto, and at the one or more capture units, performing acoustic echo cancellation on the second audio signals using the copy of the first audio signals that correspond to the one or more playback units that are within the listening distance.

3. A non-transitory computer readable medium comprising a set of executable instructions to direct a processor to perform the method recited in claim 2.

\* \* \* \* \*